United States Patent
Nordbruch

(10) Patent No.: US 10,713,954 B2
(45) Date of Patent: Jul. 14, 2020

(54) METHOD AND APPARATUS FOR OPERATING A VEHICLE

(71) Applicant: Robert Bosch GmbH, Stuttgart (DE)

(72) Inventor: Stefan Nordbruch, Kornwestheim (DE)

(73) Assignee: Robert Bosch GmbH, Stuttgart (DE)

( * ) Notice: Subject to any disclaimer, the term of this patent is extended or adjusted under 35 U.S.C. 154(b) by 263 days.

(21) Appl. No.: 15/757,216

(22) PCT Filed: Jul. 15, 2016

(86) PCT No.: PCT/EP2016/066867
§ 371 (c)(1),
(2) Date: Mar. 2, 2018

(87) PCT Pub. No.: WO2017/041942
PCT Pub. Date: Mar. 16, 2017

(65) Prior Publication Data
US 2018/0286249 A1   Oct. 4, 2018

(30) Foreign Application Priority Data

Sep. 11, 2015 (DE) .................. 10 2015 217 389

(51) Int. Cl.
*G05D 1/02* (2020.01)
*G08G 1/16* (2006.01)

(52) U.S. Cl.
CPC .......... *G08G 1/168* (2013.01); *G05D 1/0214* (2013.01); *G08G 1/164* (2013.01); *G05D 2201/0212* (2013.01); *G05D 2201/0213* (2013.01)

(58) Field of Classification Search
CPC ...... G08G 1/168; G08G 1/164; G05D 1/0214; G05D 2201/0212; G05D 2201/0213; G05D 1/0088
See application file for complete search history.

(56) References Cited

U.S. PATENT DOCUMENTS

| | | | | |
|---|---|---|---|---|
| 5,586,030 A | * | 12/1996 | Kemner | G05D 1/0257 340/909 |
| 7,734,403 B2 | * | 6/2010 | Baijens | B60T 8/24 340/903 |

(Continued)

FOREIGN PATENT DOCUMENTS

| DE | 102012215343 A1 | 5/2014 |
|---|---|---|
| DE | 102012222562 A1 | 6/2014 |

(Continued)

OTHER PUBLICATIONS

International Search Report dated Oct. 6, 2016, of the corresponding International Application PCT/EP2016/066867 filed Jul. 15, 2016.

*Primary Examiner* — Michael C Zarroli
(74) *Attorney, Agent, or Firm* — Norton Rose Fullbright US LLP; Gerard Messina

(57) ABSTRACT

A method for operating a vehicle. If the vehicle is traveling without a driver within a parking facility, and if an emergency-stop request is present to the effect that the vehicle moving without driver is to stop, it is checked whether the stop is necessary. An emergency stop signal is generated, in response to which the vehicle stops without driver, only if the check is positive. A corresponding apparatus, a vehicle, a method for operating a parking facility for vehicles, a parking facility for vehicles, and a computer program.

15 Claims, 3 Drawing Sheets

(56) References Cited

U.S. PATENT DOCUMENTS

| | | | | |
|---|---|---|---|---|
| 8,090,491 | B2* | 1/2012 | Barfoot | G05D 1/0297 180/116 |
| 9,194,168 | B1* | 11/2015 | Lu | E05F 15/70 |
| 10,466,061 | B2* | 11/2019 | Newman | B60K 28/06 |
| 10,551,831 | B2* | 2/2020 | Nordbruch | B60T 7/12 |
| 2009/0248231 | A1* | 10/2009 | Kamiya | G05D 1/0061 701/23 |
| 2010/0156672 | A1* | 6/2010 | Yoo | G08G 1/14 340/932.2 |
| 2014/0114526 | A1* | 4/2014 | Erb | G01S 17/04 701/28 |
| 2018/0088572 | A1* | 3/2018 | Uchida | B60W 30/182 |

FOREIGN PATENT DOCUMENTS

| | | |
|---|---|---|
| DE | 102013213379 A1 | 1/2015 |
| DE | 102013218812 A1 | 3/2015 |
| DE | 102014014249 A1 | 3/2015 |
| DE | 102013019027 A1 | 5/2015 |
| EP | 1143314 A1 | 10/2001 |

* cited by examiner

METHOD AND APPARATUS FOR OPERATING A VEHICLE

FIELD

The present invention relates to a method and an apparatus for operating a vehicle. The present invention further relates to a vehicle. In addition, the present invention relates to a method for operating a parking facility for vehicles. The present invention relates to a parking facility for vehicles, as well as to a computer program.

BACKGROUND INFORMATION

German Patent Application No. DE 10 2012 222 562 A1 describes a system for managed parking areas, in order to transfer a vehicle from a starting position to a destination position.

In the case of fully automated (autonomous) so-called valet parking, a driver parks his vehicle at a drop-off location, for example, in front of a parking garage, and from there, the vehicle drives itself to a parking position/parking space and back again to the drop-off location.

For what is commonly known as fully automated valet parking, it is important that the autonomously moving vehicle does not cause any accidents, for example, does not collide with an object that is within the parking facility.

SUMMARY

An object of the present invention includes efficiently reducing a risk of accident or collision for a vehicle moving without a driver within a parking facility.

According to one aspect of the present invention, a method is provided for operating a vehicle, whereby if the vehicle is traveling without a driver within a parking facility, and if an emergency-stop request is present to the effect that the vehicle moving without driver is to stop, it is checked whether the stop is necessary, and only if the check is positive is an emergency-stop signal generated, in response to which, the vehicle stops without driver.

According to a further aspect, an apparatus is provided for operating a vehicle, including an emergency-stop device which is designed, in the event the vehicle is traveling without a driver within a parking facility, to stop the vehicle in response to an emergency-stop signal, and a checking device which is designed, in the event an emergency-stop request is present to the effect that the vehicle is to stop, to check whether the stop is necessary, the checking device being designed to generate an emergency-stop signal for the emergency-stop device only if the check is positive.

According to another aspect, a vehicle is provided which is designed to travel without driver within a parking facility, the vehicle including the apparatus for operating a vehicle.

According to a further aspect, a method is provided for operating a parking facility for vehicles, whereby if a vehicle is traveling without a driver within the parking facility, and if an emergency-stop request is present to the effect that the vehicle is to stop, it is checked off-board the vehicle whether the stop is necessary, an emergency-stop signal being generated and transmitted to the driverless moving vehicle via a communication network only if the check is positive.

According to a further aspect of the present invention, a parking facility for vehicles is provided, the parking facility being designed to carry out the method for operating a parking facility for vehicles.

According to another aspect of the present invention, a computer program is provided that includes program code for carrying out the method for operating a vehicle and/or for carrying out the method for operating a parking facility for vehicles, when the computer program is executed on a computer.

Thus, particularly and among other things, the present invention includes that before the vehicle traveling without a driver stops in response to an emergency-stop signal, it is first checked whether a stop is necessary. If it is determined during checking that the stop is not necessary, then the vehicle will not stop, notwithstanding that an emergency-stop request exists for the vehicle.

If it is determined during checking that a stop is necessary, then an emergency-stop signal is generated, in response to which, the vehicle stops without driver. In other words, a positive check therefore means that the check has shown that a stop is necessary. A negative check means that the check has shown that a stop is not necessary.

Thus, owing to the fact that prior to the stop, it is checked once again whether the stop is necessary, it is possible to ensure in advantageous manner that the situation which has led to the emergency-stop request is really a situation which makes a stop necessary. Therefore, false alarms may be avoided, for example, which could potentially disrupt operation of the parking facility if the vehicle stops unnecessarily in response to such a false alarm. If there are too many false alarms, the result could be that because of the lack of acceptance, stopping in response to an emergency-stop signal is dispensed with altogether, which then, in turn, could lead to collisions, however.

In particular, the technical advantage is thus ensured that efficient stopping of the vehicle is made possible in the event an emergency-stop request is present.

Moreover, by providing the check, notably, the technical advantage is obtained that acceptance for such a concept is increased, because too many false alarms could reduce acceptance for a concept that provides for stopping in the event an emergency-stop request is present, for as a rule, false alarms are not popular because, e.g., disrupted operation of the vehicle could waste time unnecessarily for users. Therefore, for example, the provision of the check according to the present invention thus yields the technical advantage that time may be saved for a user, insofar as operation of the vehicle and/or of the parking facility is not, or at least is less disrupted.

According to one specific embodiment, a vehicle is a motor vehicle. For instance, the motor vehicle is a passenger car (PC) or a truck (TRK). For example, the motor vehicle is a two-wheeled motor vehicle, e.g., a motorcycle. Vehicles within the meaning of the present invention are therefore motor vehicles, for example.

A parking facility in terms of the present invention may be referred to as a parking area, and is used as parking for vehicles. Thus, the parking facility forms one cohesive area that has a plurality of parking spaces (in the case of a parking facility on private property) or parking stands (in the case of a parking facility on public property). According to one specific embodiment, the parking facility takes the form of a multi-level parking lot. According to one specific embodiment, the parking facility takes the form of a parking garage.

In one specific embodiment, the driverless travel of the vehicle is part of an automatic parking process. Such an automatic parking process includes that the vehicle is guided without driver or in driverless fashion from a starting position, which may also be referred to as a drop-off position, to a parking position, and parked there. The automatic parking process also includes that the vehicle is guided without driver or in driverless fashion from the parking position to a pick-up position, and parked there. A drop-off position denotes a position at which the vehicle is to be parked by a person for the implementation of an automatic parking process. A pick-up position denotes a position at which a person is to pick up the vehicle at the end of the automatic parking process. An automatic parking process may be referred to as an AVP process. "AVP" stands for "automated valet parking" and may thus be denoted by "automatic parking process."

The fact that the vehicle travels without a driver indicates or means that the vehicle is not controlled or guided by a human operator or human driver. Driverless travel includes, for example, that the vehicle is operated by remote control. For instance, this means that remote-control commands are transmitted to the vehicle. Driverless travel includes, for example, that the vehicle drives autonomously, thus, independently. For instance, mixed forms are provided, meaning that the vehicle drives one section operated by remote control, and drives another section autonomously.

For instance, a destination position within the parking facility is communicated to the vehicle, the vehicle then driving autonomously, thus, independently, to this destination position. For example, the vehicle navigates to the destination position based on a digital map of the parking facility. This digital map is transmitted to the vehicle via a communication network, for example. In general, for instance, information which is relevant for autonomous driving within the parking facility is transmitted to the vehicle via the communication network. The vehicle then drives autonomously within the parking facility, particularly to the destination position, based on this information. As illustration, such information includes: Positions of further vehicles, speed data of further vehicles, a setpoint trajectory to be followed by the vehicle.

According to one specific embodiment, the check includes checking whether a further emergency-stop request and/or another emergency-stop signal is/are present, the emergency-stop signal being generated only if a further emergency-stop request and/or another emergency-stop signal is/are present.

In particular, this yields the technical advantage that the check may be carried out efficiently. Thus, for example, it may be ensured in advantageous manner that there must first be two emergency-stop requests and/or two emergency-stop signals from different sources, before an emergency-stop signal is generated, in response to which, the vehicle stops without driver.

According to one specific embodiment, the emergency-stop request is transmitted to the vehicle via a communication network.

Notably, this provides the technical advantage that the vehicle is enabled to perform the check itself. This is particularly expedient, since ultimately the vehicle must execute the emergency stop, thus, come to a stop.

According to one specific embodiment, the further emergency-stop request and/or the other emergency-stop signal is/are transmitted to the vehicle via the communication network.

In particular, this provides the technical advantage that it is possible to signal efficiently to the vehicle that a further emergency-stop request or another emergency-stop signal also exists or exist, so that if the vehicle itself has generated an emergency-stop request, the vehicle is now able to decide efficiently that the stop is necessary, inasmuch as in addition to the self-generated emergency-stop request, a further emergency-stop request and/or another emergency-stop signal exist(s), which is an indication that a stop is necessary.

According to one specific embodiment, the check is performed by the vehicle or by a parking-facility management server off-board the vehicle.

Specifically, this provides the technical advantage that if the vehicle does the checking, the decision about whether the stop is necessary is made by the entity which also must implement the decision taken. Particularly if the parking-facility management server does the checking, the resources of the parking-facility management server are used efficiently in advantageous manner. It is often better equipped technically than a checking device on-board the vehicle, and is therefore able to perform the check faster and more efficiently. In particular, generally, more information sources, which may be used for the checking, are available to the parking-facility management server than to the vehicle. For example, such information sources are environment sensors, which are disposed within the parking facility.

According to a further specific embodiment, the emergency-stop request is generated by the vehicle itself based on a dangerous situation recognized by the vehicle, or was generated by the parking-facility management server itself based on a dangerous situation recognized by the parking-facility management server, the check including that the vehicle or the parking-facility management server checks the recognized dangerous situation, as to whether the stop is necessary.

In particular, this yields the technical advantage that a recognized dangerous situation may be checked efficiently.

For example, a dangerous situation includes an imminent collision with an object. Such an object is a further vehicle, for instance, an infrastructure of the parking facility or a person. Thus, a dangerous situation means, in particular, that an object is in the driving environment of the vehicle, a collision with this object being imminent.

According to one specific embodiment, the vehicle recognizes the dangerous situation with the aid of its environment sensor system. An environment sensor system includes one or more environment sensors. For example, an environment sensor is one of the following environment sensors: video sensor, laser sensor, ultrasonic sensor, lidar sensor, magnetic sensor or radar sensor.

The recognition of the dangerous situation thus includes, in particular, sensing of the driving environment with the aid of the environment sensor system of the vehicle. The sensed driving environment is then analyzed specifically for possible dangerous situations. Notably, speed data and position data of the vehicle are taken into account in this analysis.

According to one specific embodiment, the parking-facility management server recognizes the dangerous situation with the aid of an environment sensor system located within the parking facility. An environment sensor system includes one or more environment sensors. For example, an environment sensor is one of the following environment sensors: video sensor, laser sensor, ultrasonic sensor, lidar sensor, magnetic sensor or radar sensor.

Thus, the recognition of the dangerous situation specifically includes sensing of the driving environment with the aid of the environment sensor(s) located within the parking facility. The sensed driving environment is then analyzed specifically for possible dangerous situations. Notably, speed data and position data of the vehicle are taken into account in this analysis.

The environment sensor system of the vehicle may be referred to as on-board environment sensor system. The environment sensor system disposed within the parking facility may be referred to as off-board environment sensor system or the parking facility's own environment sensor system.

According to one specific embodiment, the dangerous situation was recognized based on a first sensing of the driving environment by a first environment sensor, the recognized dangerous situation being checked based on a second sensing of the driving environment by a second environment sensor, in order to check the first and the second sensing of the driving environment against each other for plausibility.

In particular, this yields the technical advantage that the check may be performed efficiently. Notably, it is thus possible, for example, to compensate for or recognize malfunctions of or false sensing by the first environment sensor, for if the second environment sensor likewise detects a situation in which a stop is necessary, then it may be assumed with greater probability that a stop is really necessary, than if only one environment sensor were to be used. For example, the plausibility check includes checking whether objects which were detected in the driving environment according to the first sensing of the driving environment, can also be recognized based on the second sensing of the driving environment.

For instance, the first environment sensor and the second environment sensor are environment sensors of an environment sensor system of the vehicle. The vehicle senses its driving environment with the aid of such an environment sensor system. According to the driving environment sensed, driving-environment data are then formed, thus, for example, first driving-environment data (the driving-environment data of the first environment sensor) and second driving-environment data (the driving-environment data of the second environment sensor), the data being analyzed as to whether or not a stop is necessary.

This holds true analogously for a parking facility's own environment sensor system. Thus, the first and the second environment sensors are environment sensors of the parking facility's own environment sensor system.

According to one specific embodiment, the first environment sensor is an environment sensor of an environment sensor system on-board the vehicle, and the second environment sensor is an environment sensor of a parking facility's own environment sensor system or vice versa.

That is, for example, the dangerous situation was recognized by the vehicle and is then checked by the parking-facility management server or vice versa. In response to a recognized dangerous situation, the parking-facility management server receives from the vehicle an emergency-stop request, which is then checked by the parking-facility management server, an emergency-stop signal being transmitted by the parking-facility management server to the vehicle via the communication network in the event the check is positive.

That is, for example, the dangerous situation was recognized by the parking-facility management server, and is then checked by the vehicle or vice versa. In response to a recognized dangerous situation, the parking-facility management server transmits to the vehicle an emergency-stop request, which then can be or rather is checked by the vehicle, an emergency-stop signal being able to be or rather being generated by the vehicle itself in the event the check is positive.

In one specific embodiment, if the check of the recognized dangerous situation based on the second sensing of the driving environment shows that a stop is not necessary, both the first and the second environment sensor each sense the driving environment again, so that based on the respective repeated sensing of the driving environment, it is checked whether a stop is necessary, the emergency-stop signal being generated if the respective check of the repeated driving-environment sensings comes to different conclusions.

In particular, this yields the technical advantage that safety may be further increased, for by the repeated sensing of the driving environment accompanied by a repeated check, possible faults in the environment sensors may be detected efficiently in advantageous manner. Notably, it is thus possible to efficiently recognize situations which are difficult to analyze as to whether or not only one dangerous situation is present that makes or does not make a stop necessary. As a rule, such unclear situations can lead to different conclusions. In unclear situations, for safety reasons, it is more sensible to stop, which is therefore thus provided for according to the present invention.

Different conclusions mean that one check has shown that a stop is necessary, and another check has shown that a stop is not necessary.

If both checks come to the same conclusion, that a stop is necessary, the emergency-stop signal is generated.

If both checks come to the same conclusion, that a stop is not necessary, no emergency-stop signal is generated.

The repeated check thus gives both comfort (not stopping immediately in response to every emergency-stop request, without checking it) and safety (repeated check of the situation with stopping if the analyses of the driving-environment sensing come to different conclusions).

For example, the first and the second environment sensor are the same or different. Thus, for instance, the first environment sensor may be a radar sensor. The second environment sensor, for example, is a video sensor. For instance, the environment sensor system includes two radar sensors. Here, the first environment sensor would then be a radar sensor, and the second environment sensor would be a radar sensor. The same holds true for video sensors.

According to one specific embodiment, the apparatus for operating a vehicle is designed or equipped to carry out or implement the method for operating a vehicle. Technical functionalities of the apparatus for operating a vehicle are derived analogously from corresponding technical functionalities of the method for operating a vehicle and vice versa. Remarks which are made herein in connection with the apparatus for operating a vehicle hold true analogously for specific embodiments pertaining to the method for operating a vehicle and vice versa.

According to one specific embodiment, an emergency-stop request is received by a management server of the parking facility from a user of a communication network via the communication network, the off-board check being performed by the parking-facility management server, which in the event the check is positive, generates the emergency-stop signal and transmits it via a communication network to the driverless moving vehicle.

In particular, this provides the technical advantage that the check may be carried out efficiently, for as a rule, a parking-facility management server has greater computing capacities than a processing device in the vehicle itself, which is to decide whether or not the stop is necessary. Usually more information for the check is available to the parking-facility management server than to the vehicle, so that the parking-facility management server is able to perform the check especially efficiently and effectively.

A communication network in terms of the present invention includes, in particular, a WLAN communication network and/or a cellular network and/or a communication network according to the LoRa standard. "LoRa" stands for "Low Power Wide-Range Communication." Therefore, according to one specific embodiment, the communication network includes a LoRa communication network.

In another specific embodiment, a communication via the communication network becomes or rather is encoded.

The formulation "or rather" in particular includes the formulation "and/or."

According to one specific embodiment, the emergency-stop signal which is generated after the check includes an identifier or a marking to the effect that a check has taken place. Advantageously, a receiver of the emergency-stop signal, here especially the vehicle, thus knows that a check has already taken place, so that, for example, the vehicle stops immediately in response to the emergency-stop signal, without first itself still performing its own check.

According to one specific embodiment, in the event a check is negative, a new check is carried out. If the new check is also negative, an emergency-stop signal is generated.

The present invention is explained in greater detail below on the basis of preferred exemplary embodiments.

DETAILED DESCRIPTION OF EXAMPLE EMBODIMENTS

Figure 1:
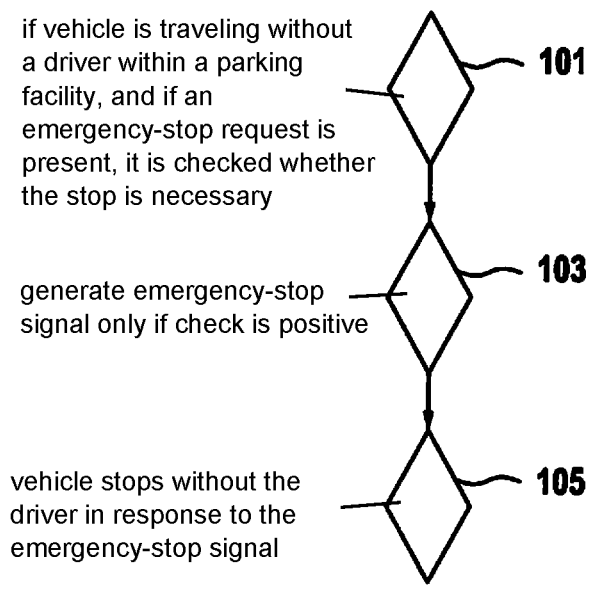
FIG. 1 shows a flowchart of a method for operating a vehicle.

FIG. 1 shows a flowchart of a method for operating a vehicle.

According to a step 101, it is provided that if the vehicle is traveling without a driver within a parking facility, and if an emergency-stop request is present to the effect that the vehicle traveling without driver is to stop, it is checked whether the stop is necessary. If it is determined in checking step 101 that the stop is necessary, then according to a step 103, an emergency-stop signal is generated. In this context, it is provided that an emergency-stop signal is generated only in the event the check is positive. That is, specifically, the emergency-stop request must thus be confirmed. This is accomplished, for example, by a further emergency-stop request and/or by another emergency-stop signal. In other words, the emergency-stop signal is thus generated only if the emergency-stop request is confirmed. Consequently, the emergency-stop signal may be referred to generally as a confirmed emergency-stop signal.

In a step 105, the vehicle stops without driver in response to the emergency-stop signal. For example, the emergency-stop signal is transmitted to the vehicle via a communication network. The vehicle stops in response to the receipt of the emergency-stop signal. For instance, the emergency-stop signal is generated on-board the vehicle. This is so, for instance, since the vehicle has recognized and has once again checked, thus, examined a self-detected dangerous situation, so that the vehicle has decided that the stop is necessary.

Figure 2:
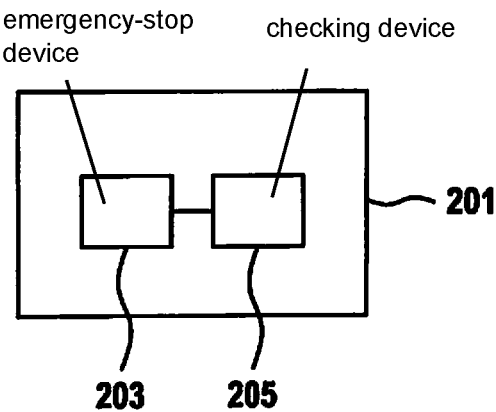
FIG. 2 shows an apparatus for operating a vehicle.

FIG. 2 shows an apparatus 201 for operating a vehicle.

Apparatus 201 includes an emergency-stop device 203 which is designed, in the event the vehicle is traveling without driver within a parking facility, to stop the vehicle in response to an emergency-stop signal.

Apparatus 201 also includes a checking device 205 which is designed, in the event an emergency-stop request to the effect that the vehicle is to stop is present, to check whether the stop is necessary, checking device 205 being designed to generate an emergency-stop signal for emergency-stop device 203 only if the check is positive.

In other words, for example, checking device 205 thus checks a recognized dangerous situation as to whether the circumstances underlying the dangerous situation make a stop necessary. Not until then does checking device 205 generate an emergency-stop signal for emergency-stop device 203, in response to which, emergency-stop device 203 stops the vehicle.

Notably, that means that an emergency-stop request on its own is thus not yet sufficient, in order for the vehicle to stop. Rather, a confirmation of this emergency-stop request is needed. For example, this confirmation may include a further emergency-stop request and/or a further emergency-stop signal. A further emergency-stop signal alone is also not sufficient, in order for the vehicle to stop.

Figure 3:
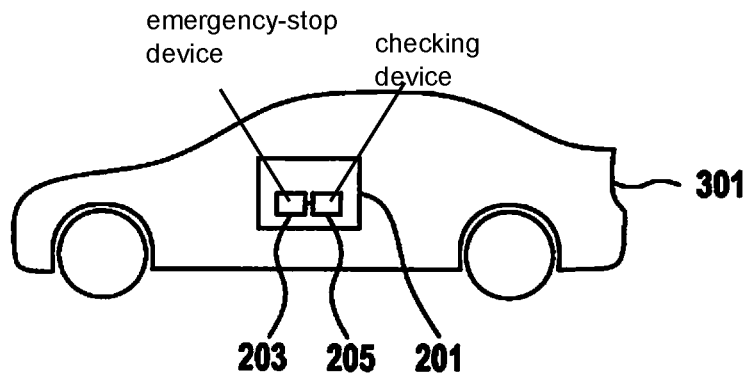
FIG. 3 shows a vehicle.

FIG. 3 shows a vehicle 301.

Vehicle 301 is designed to drive without driver within a parking facility. Vehicle 301 includes apparatus 201 according to FIG. 2.

Figure 4:
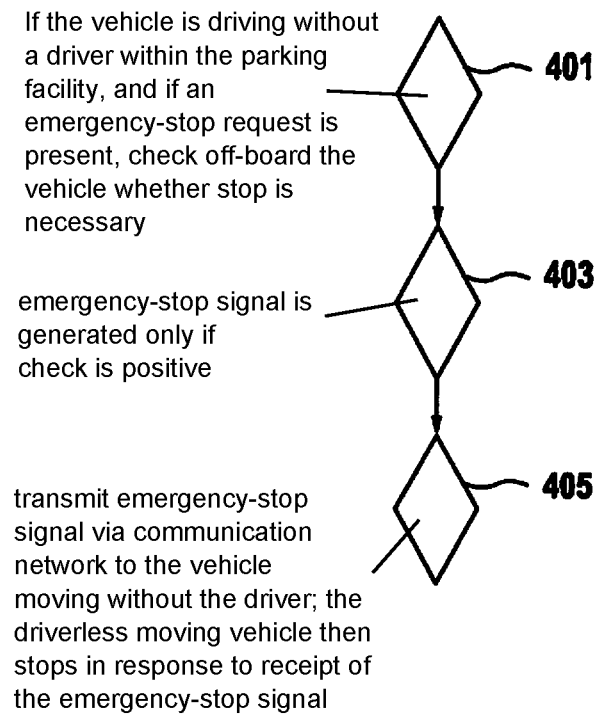
FIG. 4 shows a flowchart of a method for operating a parking facility for vehicles.

FIG. 4 shows a flowchart of a method for operating a parking facility for vehicles.

According to a step 401, it is provided that if the vehicle is driving without driver within the parking facility, and if an emergency-stop request is present to the effect that the vehicle is to stop, it is checked off-board the vehicle, whether the stop is necessary. In other words, the check does not take place within the vehicle, but rather outside of the vehicle, e.g., with the aid of a management server of the parking facility.

In a step 403, it is provided that an emergency-stop signal is generated only if the check is positive. In other words, step 403 is thus only carried out if the check according to step 401 has shown that the stop is necessary.

In a step 405, the emergency-stop signal is transmitted via a communication network to the vehicle moving without driver. In particular, the driverless moving vehicle then stops in response to receipt of the emergency-stop signal.

Figure 5:
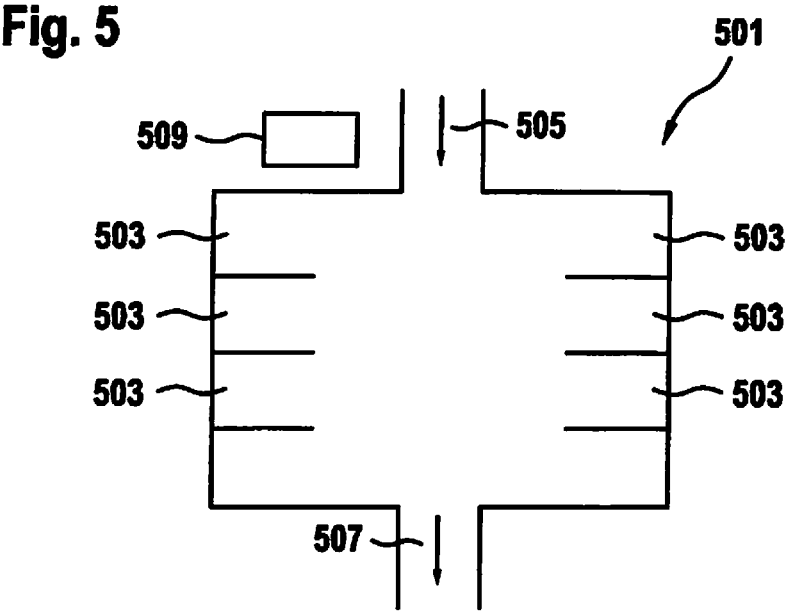
FIG. 5 shows a parking facility.

FIG. 5 shows a parking facility 501.

Parking facility 501 includes a plurality of parking spaces 503, in which vehicles are able to park. Parking facility 501 includes an entrance 505 and an exit 507.

Parking facility 501 includes a parking-facility management server 509, which is designed to carry out or implement the method for operating a parking facility for vehicles.

For instance, parking-facility management server 509 receives an emergency-stop request from a user of a communication network via the communication network. For example, this user, who is in parking facility 501, has seen a situation for a driverless moving vehicle that could lead, e.g., to a collision of the vehicle with a further object. Consequently, he is requesting a halt of the vehicle on the part of the parking-facility management server.

According to the present invention, this emergency-stop request is now checked. Thus, parking-facility management server 509 checks whether a stop is necessary. For example, parking-facility management server 509 checks the instantaneous situation in which the vehicle finds itself, as to whether a collision has a predetermined probability or has a probability that is greater than a predetermined probability threshold value. If this should be the case, it is an indication for parking-facility management server 509 that the stop is necessary, since otherwise a collision could occur. Consequently, parking-facility management server 509 generates an emergency-stop signal and then transmits it to the driverless moving vehicle via the communication network. Otherwise, no emergency-stop signal is generated, and thus no emergency-stop signal is transmitted via the communication network to the driverless moving vehicle, either. In this case, the driverless moving vehicle will then continue its driverless travel. Thus, the emergency-stop request then does not lead to the goal of stopping the driverless moving vehicle.

Hence, parking facility 501 is designed to carry out or implement the method for operating a parking facility for vehicles.

Figure 6:
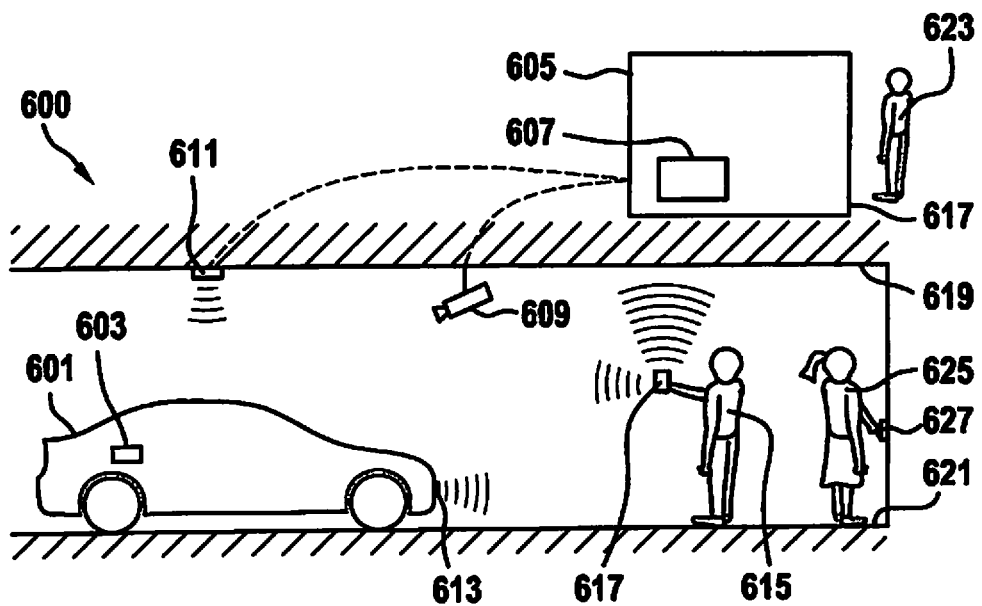
FIG. 6 shows schematically a scenario in which an example embodiment of the present invention is used.

FIG. 6 shows a schematic and simplified representation of a scenario in which an embodiment of the present invention is employed.

A parking facility 600 is shown. In a lane 621 of parking facility 600, a vehicle 601 is driving without a driver, e.g., operated by remote control or autonomously. Vehicle 601 includes a program 603 which, for example, includes steps for carrying out the method for operating a vehicle when program 603 (which is a computer program) is executed on a computer, especially on an apparatus for operating a vehicle. Consequently, according to one specific embodiment, vehicle 601 includes apparatus 201 of FIG. 2.

Vehicle 601 includes an environment sensor system 613 which, e.g., may include a radar sensor. For example, environment sensor system 613 senses a person 615 who is located within the traveling path of vehicle 601. Thus, if person 615 would not get out of the way or if vehicle 601 would not swerve or stop, there would be a collision between vehicle 601 and person 615.

Vehicle 601 thus recognizes a dangerous situation. However, this dangerous situation on its own is not yet sufficient for vehicle 601 to stop. In addition, a confirmation that this recognized dangerous situation really makes a stop necessary is also needed.

For example, such a confirmation may come from person 615 himself. Person 615 is carrying a mobile terminal 617 with him. Person 615 recognizes that vehicle 601 is driving towards him and therefore a collision could occur. Person 615 therefore transmits an emergency-stop request with the aid of terminal 617 to vehicle 601.

Consequently, vehicle 601 has the following information: the recognized dangerous situation and the emergency-stop request on the part of person 615. The recognized dangerous situation has thus been confirmed by the emergency-stop request of person 615. As a result, vehicle 601 will stop.

For example, person 615 is the driver of vehicle 601 who has left his vehicle 601 but is still in its vicinity. For instance, vehicle 601 is underway as part of an automatic parking process, and was parked by its driver at a drop-off position, for example, from which vehicle 601 is now on its way to a parking position.

For instance, person 615 may transmit an emergency-stop request via a communication network to a parking-facility management server 605. Parking-facility management server 605 includes a program 607 which, e.g., includes steps for carrying out or implementing the method for operating a parking facility. Parking-facility management server 605 receives this emergency-stop request, and may thereupon check, e.g., whether the present situation makes a stop necessary. For this, it is provided, for example, that parking-facility management server 605 record the present situation with the aid of a video camera 609. Video camera 609 is mounted on a ceiling 619 of parking facility 600. Although FIG. 6 could suggest that video camera 609 captures only vehicle 601, camera 609 has captured person 615, as well. For example, this is because camera 609 is mounted on ceiling 619 in a manner allowing it to swivel or rotate.

Parking-facility management server 605 therefore recognizes that a stop is necessary, and generates and transmits an emergency-stop signal to vehicle 601. This is accomplished with the aid of a communication interface 611 which, for example, is a WLAN base station. Communication interface 611 is likewise mounted on ceiling 619 of parking facility 600.

Thus, two items of information are available to vehicle 601 according to this order of events, as well: the self-recognized dangerous situation and the emergency-stop signal from parking-facility management server 605. Consequently, the originally generated emergency-stop signal of vehicle 601 has been confirmed by the further emergency-stop signal from parking-facility management server 605. Therefore, vehicle 601 will stop.

It is further provided, for example, that a pedestrian 625 has recognized the imminent collision between vehicle 601 and person 615, and actuates a switch 627 in order to request an emergency stop on the part of parking-facility management server 605. Analogously to terminal 617 of person 615, this request is transmitted to parking-facility management server 605. The following steps are analogous.

In addition, for example, the following order of events is provided:

With the aid of parking-facility management server 605, an operator or an attendant 623 of parking facility 600 recognizes via video camera 609 that a collision could be imminent between vehicle 601 and person 615. He thereupon transmits an emergency-stop signal via communication interface 611 to vehicle 601.

Vehicle 601 receives this emergency-stop signal, but will not yet stop, for the emergency-stop signal must first be confirmed, before vehicle 601 actually stops. For example, this confirmation may include that vehicle 601 senses person 615 with the aid of its environment sensor system 613 and comes to the conclusion that a collision is probable. For instance, the confirmation may include that vehicle 601 receives an emergency-stop request, which was sent by person 615 with the aid of terminal 617 to vehicle 601.

In summary, the present invention notably provides a technical solution which increases acceptance for the provision of an emergency stop for vehicles that are moving without driver or in driverless fashion within a parking facility. In accordance with the present invention, in the case of unclear and/or dangerous situations, an emergency stop (thus, a halt) is only carried out in response to a confirmed signal. In other words, an emergency-stop signal alone is thus not yet sufficient. A confirmation for this emergency-stop signal is still needed, which therefore may then be referred to as a confirmed emergency-stop signal.

In other words, the emergency stop (the halt) is thus not triggered immediately in response to a first triggering signal (emergency-stop request or further emergency-stop signal), but rather only if a check of the first signal is carried out with at least one further signal, and the emergency stop is only executed if there is a confirmation of the present situation to the effect that, for example, there would be a collision.

In this context, for example, the corresponding triggering signals may come from the vehicle, from the parking-facility management system, from the driver or from a pedestrian. Preferably, a check is carried out in the vehicle itself, since the vehicle must itself execute the emergency stop.

Situations or scenarios in which a stop is requested or in which an emergency-stop signal is transmitted to the vehicle or in which the vehicle itself generates an emergency-stop signal and, after a check, stops in response to it, are, in particular, one or more of the following situations or scenarios:

The vehicle recognizes an unclear and/or identified problem situation. For example, such situations are the following situations:

A pedestrian suddenly crosses the traveling path of the vehicle, e.g., the pedestrian comes out from between two vehicles.

A vehicle suddenly crosses the traveling path of the vehicle, for example, pulls out of a parking space, and has not seen the vehicle moving without driver.

A communication problem has occurred.

The parking-facility management system has an internal fault. According to one specific embodiment, this internal fault may be detected as follows: The parking-facility management system performs check routines and/or redundant calculation functions. Components of the parking-facility management system and/or the parking-facility management system itself as a whole is/are thereby checked. For example, the monitoring sensors (e.g., cameras), thus, for instance, the environment sensors are checked for operational capability, e.g., for a frozen image and/or whether a signal is coming from the camera (in general, from the environment sensor) at all. If it is determined in this way that an environment sensor is not functioning properly, this is then identified as an internal fault.

If the parking-facility management system recognizes a fault, the occurrence of the fault is communicated to the vehicle via the communication network, whereupon before it stops, the vehicle waits, for example, to see whether the parking-facility management system also really explicitly requests the stop of the vehicle. In other words, an internal fault in the parking-facility management system by itself is not yet sufficient for the vehicle, with knowledge of the internal fault, to stop. Only in the case of a positive check, here, for example, the explicit request for the stop on the part of the parking-facility management system, does the vehicle stop.

According to one specific embodiment, after detecting the internal fault, the parking-facility management system sends an emergency-stop signal to the vehicle via the communication network.

The vehicle has an internal fault. For example, this internal fault may be detected analogously to the detection of an internal fault in the parking-facility management system. The internal fault of the vehicle leads to stopping of the vehicle only after a positive check here, as well.

In addition, for instance, problems may be recognized in connection with or from various locations and/or people and/or products. Examples are the following:

In the vehicle, it is determined by on-board sensor systems that a pedestrian is running into the traveling path. For instance, such an on-board sensor system is an environment sensor system of the vehicle.

An internal program, which thus runs on a computer of the vehicle, detects problems, for example: no communication between the vehicle and the parking-facility management server and/or no communication between the vehicle and a further vehicle, an internal functional defect (e.g., an autonomous driving functionality no longer functions or no longer functions correctly), internal problems with components (vehicle systems, e.g., the brake signals a fault).

For instance, the internal program is not able to unequivocally judge a situation like, e.g., whether pedestrians are perhaps in the travel path.

For example, the following situations may occur in the parking-facility management or parking-facility management system:

First of all, similar or identical situations may occur with respect to the vehicle, only here instead of the vehicle, it is the parking-facility management system.

An operator of the parking facility sees a problem, and wants to trigger an emergency stop for one or all vehicles.

The driver, who is still in the vicinity, sees a problem and wants to trigger an emergency stop for one or more or all vehicles.

For example, the driver is able to trigger such an emergency stop directly via his cell phone, by transmitting an emergency-stop signal directly to his vehicle.

In particular, the driver is able to transmit a corresponding emergency-stop request via his cell phone to the parking-facility management system, which in response to it, after a positive check, transmits an emergency-stop signal to the vehicle.

A passerby, who is in the vicinity, sees a problem and wants to trigger an emergency stop of one or more or all vehicles. This is accomplished analogously as in the case of the driver, via a cell phone and with the aid of an emergency-stop request, which is transmitted to the parking-facility management server.

For example, the parking facility includes an emergency switch which, upon actuation by a passerby or user, transmits an emergency-stop request to the parking-facility management server, so that in response to the receipt of the emergency-stop request, it performs a check and transmits an emergency-stop signal to the vehicle only after a positive check.

In general, the example embodiments of the present invention may be transferred to a plurality of driverless moving vehicles which are driving within the parking facility, so that these vehicles also come to a stop immediately only, thus solely, in response to a checked emergency-stop signal, thus, only if a check as to whether the stop is necessary is positive.

What is claimed is:

1. A method for operating a vehicle, comprising:
based on determining the vehicle is traveling without a driver within a parking facility, and based on determining a request for an emergency-stop is present to the effect that the vehicle moving without driver is to stop, checking whether the requested emergency-stop is necessary, wherein the checking is performed by a parking-facility management server located off-board the vehicle, the parking-facility management server being completely separate from the vehicle; and
generating an emergency-stop signal, in response to which the vehicle stops without driver, the emergency-stop signal being generated only when the check is positive.

2. The method as recited in claim 1, wherein the check includes checking whether at least one of: (i) a further request for an emergency-stop, and (ii) another emergency-stop signal, is present, the emergency-stop signal being generated only if the at least one of the further request for an emergency-stop and another emergency-stop signal, is present.

3. The method as recited in claim 1, wherein the request for the emergency-stop at least one of: (i) is generated by the vehicle itself based on a dangerous situation recognized by the vehicle, or (ii) is generated by the parking-facility management server itself based on a dangerous situation recognized by the parking-facility management server, wherein the checking includes the parking-facility management server checking the recognized dangerous situation as to whether the requested emergency-stop is necessary.

4. The method as recited in claim 3, wherein the dangerous situation is recognized based on a first sensing of the driving environment by a first environment sensor, the recognized dangerous situation being checked based on a second sensing of the driving environment by a second environment sensor, to check the first and the second sensing of the driving environment against each other for plausibility.

5. The method as recited in claim 4, wherein if the check of the recognized dangerous situation based on the second sensing of the driving environment shows that a stop is not necessary, both the first and the second environment sensor each sense the driving environment again, so that based on the respective repeated sensing of the driving environment, it is checked whether a stop is necessary, the emergency-stop signal being generated if the respective check of the repeated driving-environment sensing comes to different conclusions.

6. A system for operating a vehicle, comprising:
an emergency-stop device designed, in the event the vehicle is traveling without a driver within a parking facility, to stop the vehicle in response to an emergency-stop signal; and
a parking-facility management server configured in the event a request for an emergency-stop is present to the effect that the vehicle is to stop, to check whether the requested emergency-stop is necessary, the parking-facility management server being configured to generate the emergency-stop signal for the emergency-stop device only if the check is positive, the parking-facility management server being located off-board the vehicle and being completely separate from the vehicle.

7. A method for operating a parking facility for vehicles, the method comprising:
based on determining a vehicle is traveling without a driver within the parking facility, and based on determining request for an emergency-stop is present to the effect that the vehicle is to stop, checking by a management server located off-board the vehicle whether the requested emergency stop is necessary, the management server being completely separate from the vehicle; and
generating, by the management server, an emergency-stop signal and transmitting, by the management server, the emergency stop signal to the driverless moving vehicle via a wireless communication network, the management server generating and transmitting the emergency-stop signal to the driverless moving vehicle only when the check is positive.

8. The method as recited in claim 7, further comprising:
receiving the request for the emergency-stop by the management server from a user of a communication network via the communication network.

9. A parking facility for vehicles, the parking facility configured to:
if a vehicle is traveling without a driver within the parking facility, and if a request for an emergency-stop is present to the effect that the vehicle is to stop, check, by a management server of the parking facility located off-board the vehicle whether the requested emergency-stop is necessary, the management server being completely separate from the vehicle; and
generate, by the management server, an emergency-stop signal and transmitting, by the management server, the emergency stop signal to the driverless moving vehicle via a wireless communication network, only if the check is positive.

10. A non-transitory computer-readable medium on which is stored a computer program, including program code for operating a vehicle, the computer program, when executed by a computer, causing the computer to perform:
based on determining the vehicle is traveling without a driver within a parking facility, and based on determining a request for an emergency-stop is present to the effect that the vehicle moving without driver is to stop, checking whether the requested emergency-stop is necessary, wherein the checking is performed by a parking-facility management server located off-board the vehicle, the parking-facility management server being completely separate from the vehicle; and
generating an emergency-stop signal, in response to which the vehicle stops without driver, the emergency-stop signal being generated only when the check is positive.

11. The method as recited in claim 1, wherein the parking-facility management server performs the checking using a video camera of the parking-facility, the video camera being completely separate from the vehicle.

12. The system as recited in claim 6, further comprising:
a video camera of the parking facility, the video camera being completely separate from the vehicle, wherein the parking-facility management server is configured to check whether the stop is necessary using the video camera.

13. The method as recited in claim 7, wherein the management server performs the checking using a video camera of the parking-facility, the video camera being completely separate from the vehicle.

14. The parking facility as recited in claim 9, wherein the management server is configured to check whether the stop is necessary using a video camera of the parking facility, the video camera being completely separate from the vehicle.

15. The non-transitory computer-readable medium as recited in claim 10, the parking-facility management server performs the checking using a video camera of the parking-facility, the video camera being completely separate from the vehicle.

* * * * *